United States Patent
Menosky et al.

(10) Patent No.: US 6,827,649 B2
(45) Date of Patent: Dec. 7, 2004

(54) UNIVERSAL JOINT WITH FRICTION FIT AND BEARING CUP RETAINER

(75) Inventors: Marc M. Menosky, Burt, MI (US); Salvatore N. Grupido, Rochester, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 10/387,103

(22) Filed: Mar. 12, 2003

(65) Prior Publication Data

US 2004/0180723 A1 Sep. 16, 2004

(51) Int. Cl.[7] .................................................. F16D 3/41
(52) U.S. Cl. ......................................... 464/14; 464/132
(58) Field of Search ..................... 464/11, 14, 130–132, 464/136; 384/425

(56) References Cited

U.S. PATENT DOCUMENTS

| | | | |
|---|---|---|---|
| 2,037,947 A | * | 4/1936 | Swenson ..................... 464/132 |
| 3,200,615 A | | 8/1965 | Stokely |
| 3,377,820 A | | 4/1968 | Smith |
| 3,479,840 A | | 11/1969 | Meyers |
| 3,595,586 A | | 7/1971 | Anderson |
| 3,658,395 A | | 4/1972 | Hallerback |
| 3,788,100 A | | 1/1974 | Pitner |
| 3,846,995 A | | 11/1974 | Mangiavacchi |
| 3,858,413 A | | 1/1975 | Nemtsov et al. |
| 3,906,746 A | | 9/1975 | Haines |
| 3,950,834 A | | 4/1976 | Pitner |
| 4,021,085 A | | 5/1977 | Willyard |
| 4,050,130 A | | 9/1977 | Pitner |
| 4,138,863 A | | 2/1979 | Olson, Sr. |
| 4,312,547 A | | 1/1982 | Negele et al. |
| 4,366,966 A | | 1/1983 | Ratsko et al. |
| 4,440,401 A | | 4/1984 | Olschewski et al. |
| 4,478,591 A | * | 10/1984 | Mangiavacchi .............. 464/14 |
| 4,515,574 A | | 5/1985 | Mazziotti |
| 4,530,675 A | | 7/1985 | Mazziotti |
| 4,576,382 A | | 3/1986 | Scharting et al. |
| 4,645,474 A | | 2/1987 | Olschewski et al. |
| 4,650,440 A | * | 3/1987 | Fisher ......................... 464/14 |
| 4,795,401 A | * | 1/1989 | Ende ........................... 464/14 |
| 4,810,233 A | | 3/1989 | Crane, Jr. et al. |
| 4,834,691 A | | 5/1989 | Schultze et al. |
| 4,861,315 A | | 8/1989 | Mazziotti |
| 4,936,133 A | | 6/1990 | Orain |
| 4,943,262 A | | 7/1990 | Schultze |
| 5,026,324 A | | 6/1991 | Schurger et al. |
| 5,256,107 A | | 10/1993 | Marsumoto et al. |
| 5,342,240 A | | 8/1994 | Mazziotti |
| 5,597,356 A | | 1/1997 | Rieder |
| 5,613,691 A | | 3/1997 | Komai et al. |
| 5,626,520 A | | 5/1997 | Mazziotti |
| 5,716,277 A | | 2/1998 | Reynolds |
| 5,725,431 A | | 3/1998 | Reynolds |
| 5,769,723 A | | 6/1998 | Faulbecker et al. |
| 5,813,916 A | | 9/1998 | Lentini et al. |
| 5,865,678 A | | 2/1999 | Koedam et al. |
| 6,050,899 A | | 4/2000 | Jones et al. |
| 6,059,663 A | | 5/2000 | Jones et al. |
| 6,077,166 A | | 6/2000 | Reynolds |
| 6,129,634 A | | 10/2000 | Nieman |
| 6,162,126 A | | 12/2000 | Barrett et al. |
| 6,183,369 B1 | | 2/2001 | Faulbecker et al. |
| 6,264,566 B1 | | 7/2001 | Nieman et al. |
| 6,280,335 B1 | | 8/2001 | Wehner et al. |
| 6,336,868 B1 | | 1/2002 | Kurecka et al. |
| 6,357,757 B1 | | 3/2002 | Hibbler et al. |
| 6,406,373 B1 | | 6/2002 | Gibson |

FOREIGN PATENT DOCUMENTS

JP          60-30829        *    2/1985    .................. 464/14

* cited by examiner

*Primary Examiner*—Greg Binda
(74) *Attorney, Agent, or Firm*—Harness, Dickey & Pierce P.L.C.

(57) ABSTRACT

A universal joint for interconnecting a pair of rotating shafts includes a pair of bifurcated yokes interconnected by a cruciform. The cruciform includes four orthogonal trunnions each including a lubricant passage. A thrust washer engages an inner surface of the lubricant passage to retain a bearing assembly on each trunnion.

12 Claims, 8 Drawing Sheets

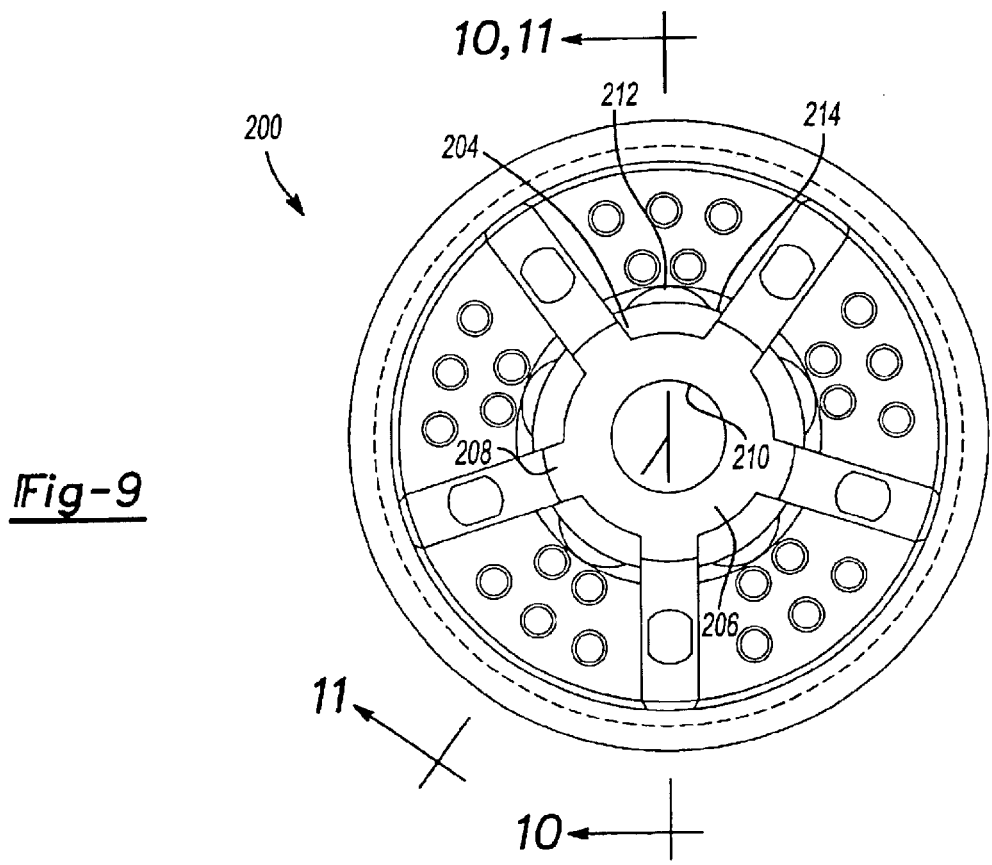
_Fig-9_
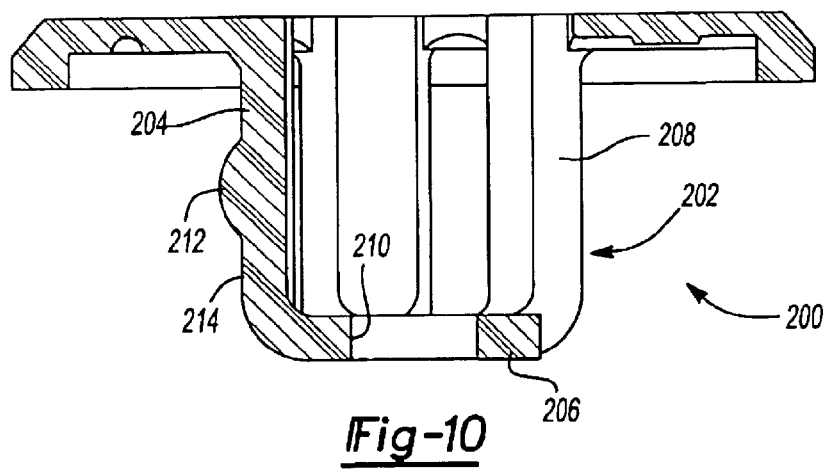
_Fig-10_

UNIVERSAL JOINT WITH FRICTION FIT AND BEARING CUP RETAINER

BACKGROUND OF THE INVENTION

The present invention generally relates to a universal joint for use in a driveline of a motor vehicle. More specifically, the present invention pertains to a universal joint equipped with a mechanism for securing a bearing cup assembly to a cruciform trunnion.

As is commonly known, universal joints are used in motor vehicle driveline applications for interconnecting a pair of rotary shafts and permitting changes in angularity therebetween. Many conventional universal joints include a pair of bifurcated yokes which are secured to the rotary shafts. The bifurcated yokes are interconnected by a spider or a cruciform for rotation about independent axes. The cruciform includes four orthogonal trunnions with each opposing pair of axially aligned trunnions mounted in a pair of aligned bores formed in the bifurcated yokes. Typically, a bearing cup is secured in each bore and a bearing assembly is retained in the bearing cup such that each yoke is supported for pivotal movement relative to one of the pairs of trunnions. In addition, it is known to use a thrust washer between the trunnion and the bearing cup to absorb the radially-directed thrust forces which may occur therebetween.

During assembly of the universal joint, difficulties may arise when attempting to couple the bearing assemblies to the bifurcated yokes. Typically, each bearing assembly, thrust washer and bearing cup are positioned on a trunnion but not positively retained thereto. During the assembly process, the bearing cup and bearing assembly may be accidentally disrupted and separated from the trunnion. Gravitational forces may also cause separation of the components during the assembly process. Possible bearing contamination and loss of productivity may result. In some instances, extraneous straps, nets or other packaging are used to retain the bearing cup assemblies in place during shipping and handling. These straps must be removed and discarded by the end user requiring expense of time and cost. Accordingly, it would be advantageous to provide a universal joint having bearing cup assemblies which are retained on the trunnions without the use of external discardable devices.

SUMMARY OF THE INVENTION

The present invention is directed to a universal joint for interconnecting a pair of rotating shafts. The universal joint includes a pair of bifurcated yokes interconnected by a cruciform. The cruciform includes four orthogonal trunnions each including a lubricant passage. A thrust washer engages an inner surface of the lubricant passage to retain a bearing assembly on each trunnion.

BRIEF DESCRIPTION OF THE DRAWINGS

The present invention will become more fully understood from the detailed description and the accompanying drawings, wherein:

FIG. 9 is a plan view of the thrust washer of FIG. 8;

FIG. 10 is a cross-sectional side view of the thrust washer of FIG. 8;

DETAILED DESCRIPTION OF THE PREFERRED EMBODIMENT

In general, the present invention is directed to a universal joint of the type used in motor vehicle driveline applications for interconnecting rotating shafts in a manner permitting changes in angularity therebetween.

Figure 1:
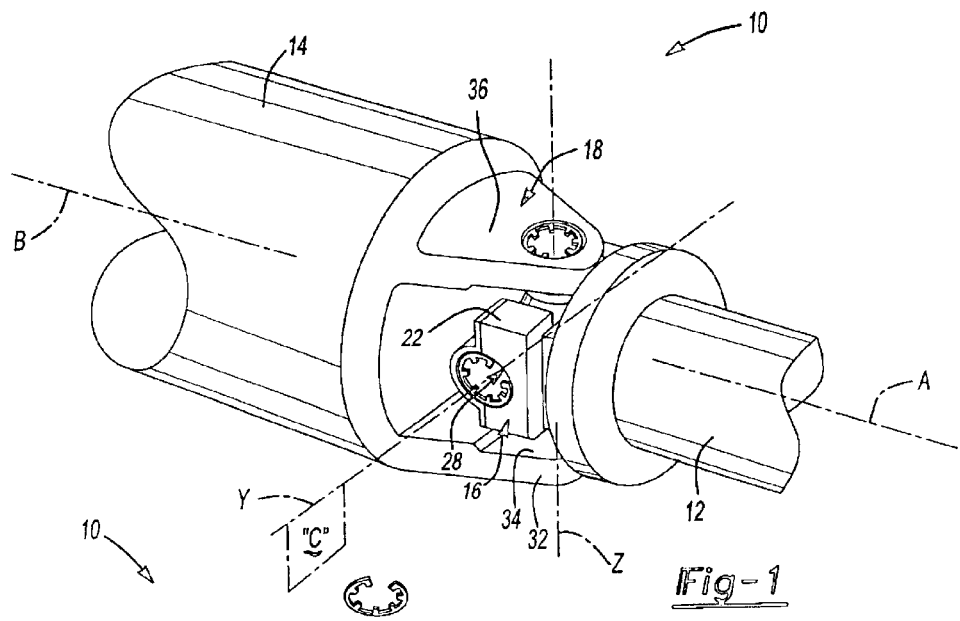
FIG. 1 is a perspective view of a universal joint according to the principals of the present invention.
Figure 2:
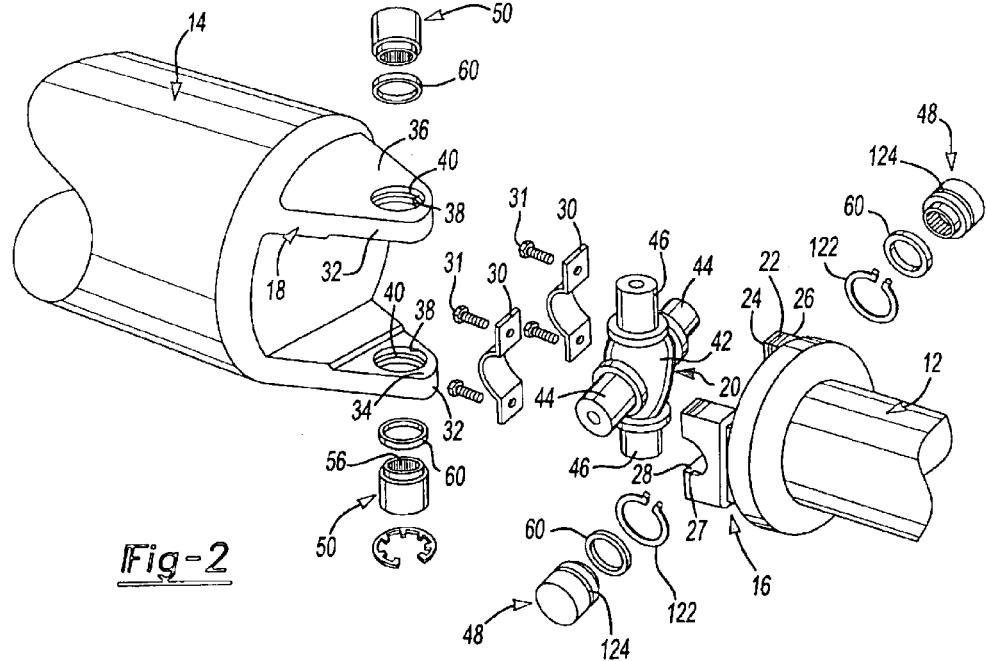
FIG. 2 is an exploded perspective view of the universal joint shown in FIG. 1.

Referring to FIGS. 1 and 2, a universal joint 10 is shown connecting a first shaft 12 to a second shaft 14. In general, universal joint 10 includes a first yoke 16 attached to an end of first shaft 12, a second yoke 18 attached to an end of second shaft 14 and a cruciform 20 interconnecting first yoke 16 to second yoke 18. The first yoke 16 is bifurcated and includes a pair of laterally-spaced legs 22 which are preferably symmetrical with respect to the rotary axis of first shaft 12, as denoted by construction line "A". Legs 22 include an inboard surface 24 and an outboard surface 26 with a journal 27 extending therebetween. Apertures 28 are formed by coupling a pair of end caps 30 to legs 22 via fasteners 31. End caps 30 cooperate with journals 27 to complete apertures 28. Apertures 28 are aligned on a first trunnion axis, as denoted by construction line "Y", which passes through and is orthogonal with respect to rotary axis "A" of first shaft 12.

Second yoke 18 is bifurcated and includes a pair of laterally-spaced legs 32 which are preferably symmetrical with respect to the rotary axis of second shaft 14, as denoted by construction line "B". Legs 32 include an inboard surface 34 and an outboard surface 36 with an aperture 38 extending therebetween. Apertures 38 are aligned on a second trunnion axis, as denoted by construction line "Z", which passes through and is orthogonal with respect to rotary axis "B" of second shaft 14. Apertures 38 are throughbores which include an annular groove 40 formed between the inboard surface 34 and the outboard surface 36. It should be noted that the shape and dimensions of apertures 28 and 38 may either be identical or different depending on the particular dimensions of cruciform 20 used therewith. It should also be noted that the annular ring grooves 40 may be formed by machining, casting or by similar technique.

As best seen in FIG. 2, cruciform 20 includes a central hub 42 from which a pair of first trunnions 44 and a pair of second trunnions 46 extend. First trunnions 44 are orthogonal with respect to second trunnions 46. First trunnions 44 are adapted for insertion into apertures 28 in legs 22 of first yoke 16 so as to be axially aligned on first trunnion axis "Y". Similarly, second trunnions 46 are adapted to be inserted into apertures 38 in legs 32 of second yoke 18 so as to be axially aligned on second trunnion axis "Z". With first trunnions 44 and second trunnions 46 installed in first and second yokes 16 and 18, respectfully, trunnion axes "Y" and "Z" pass through a common plane "C" which orthogonally intersects the rotary axis of cruciform 20, as shown in FIG. 1.

Universal joint 10 also includes a first pair of bearing cup assemblies 48 adapted to be mounted in apertures 28 and a second pair of bearing cup assemblies 50 adapted to be mounted in apertures 38. First bearing cup assemblies 48 are provided for receiving and rotatably supporting first trunnions 44 in apertures 28. Similarly, second bearing cup assemblies 50 are provided for receiving and rotatably supporting second trunnions 46 in apertures 38. For purposes of brevity, the following description will be limited to the components of first bearing cup assemblies 48 with the understanding that the corresponding components of second bearing cup assemblies 50 are substantially identical.

Figure 3:
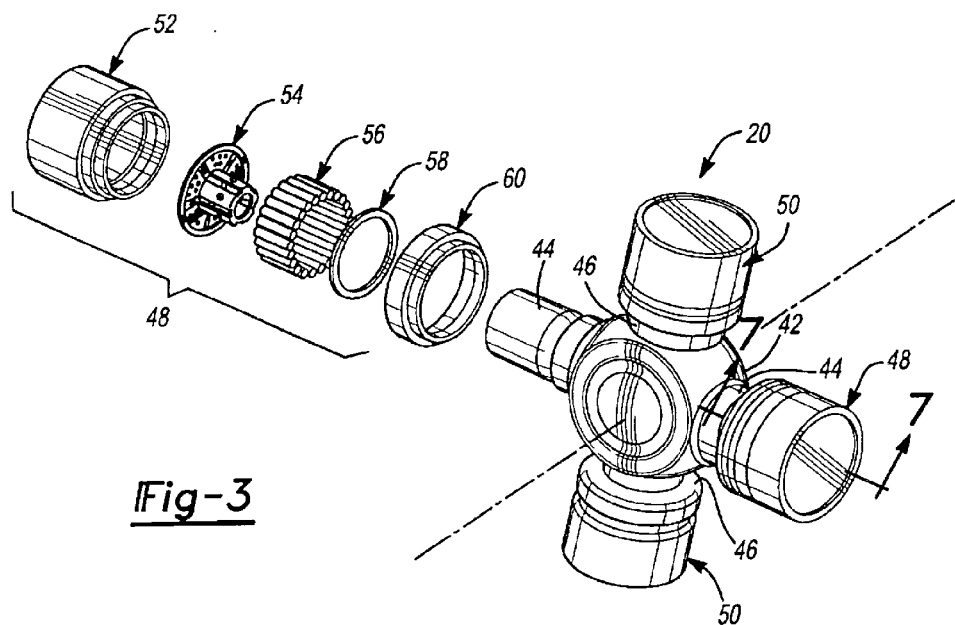
FIG. 3 is a partial exploded perspective view of a trunnion and bearing cup assembly of the present invention.
Figure 4:
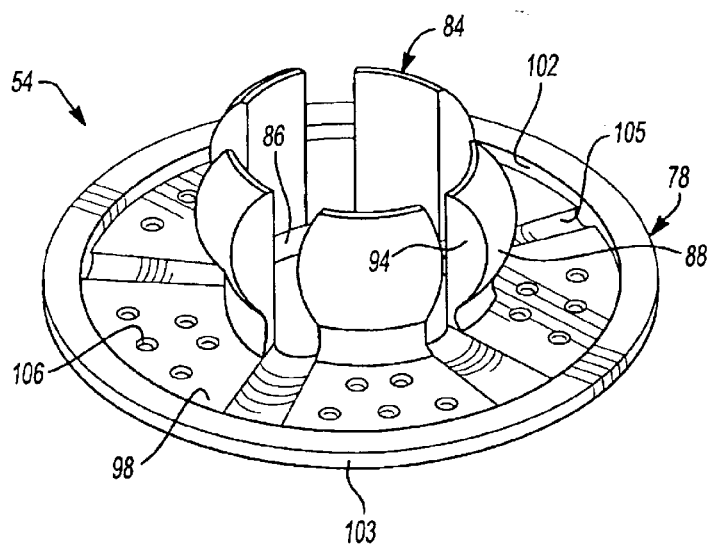
FIG. 4 is a perspective view of a first embodiment thrust washer constructed in accordance with the teachings of the present invention.
Figure 5:
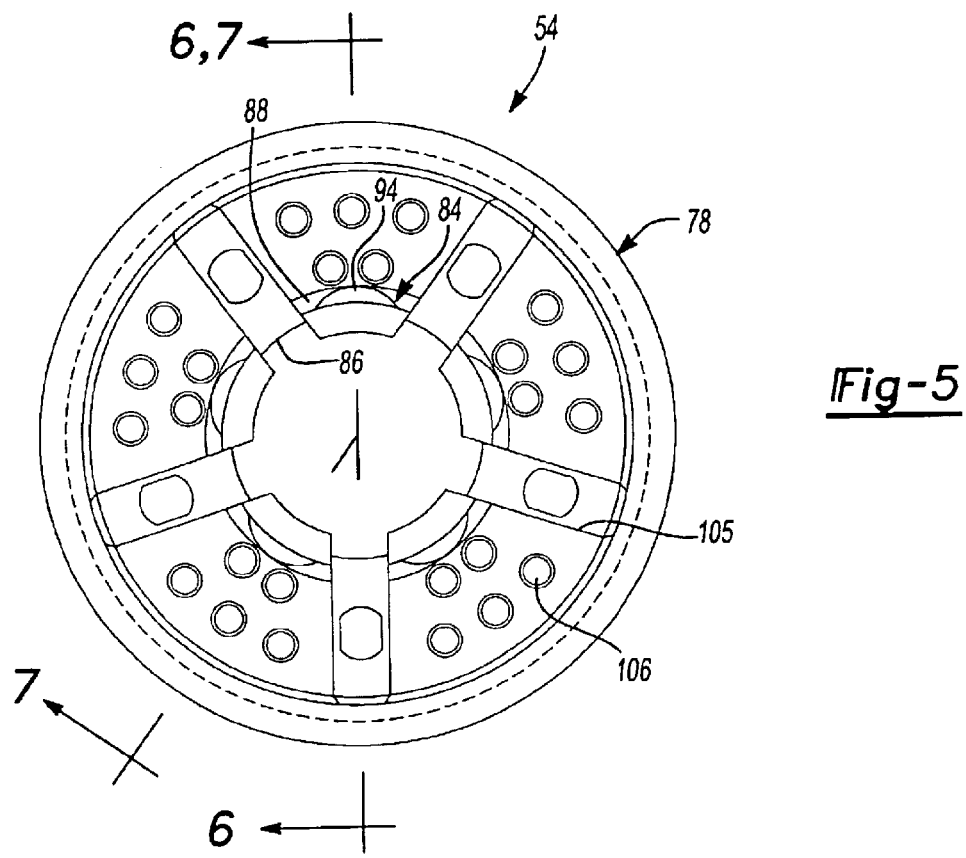
FIG. 5 is a plan view of the thrust washer of FIG. 4.
Figure 6:
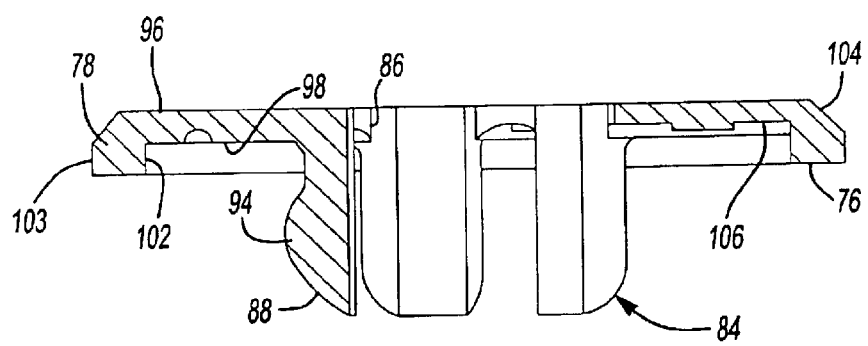
FIG. 6 is a cross-sectional side view of the thrust washer of FIG. 4.
Figure 7:
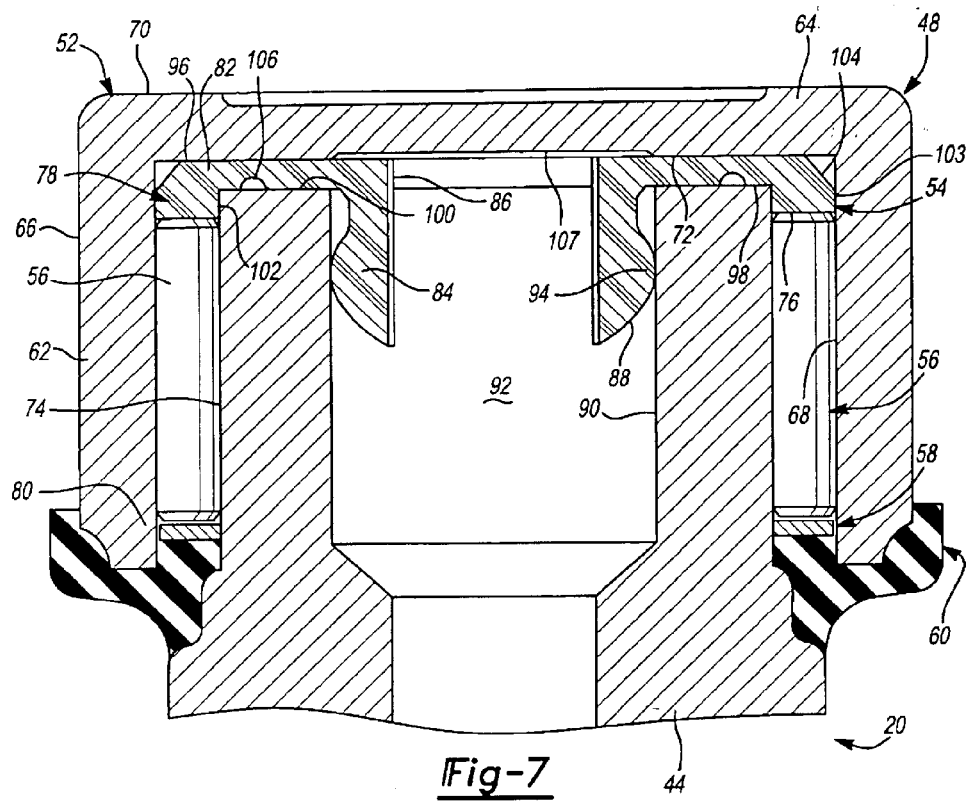
FIG. 7 is a partial cross-sectional side view of a universal joint including the thrust washer of FIG. 4.
Figure 8:
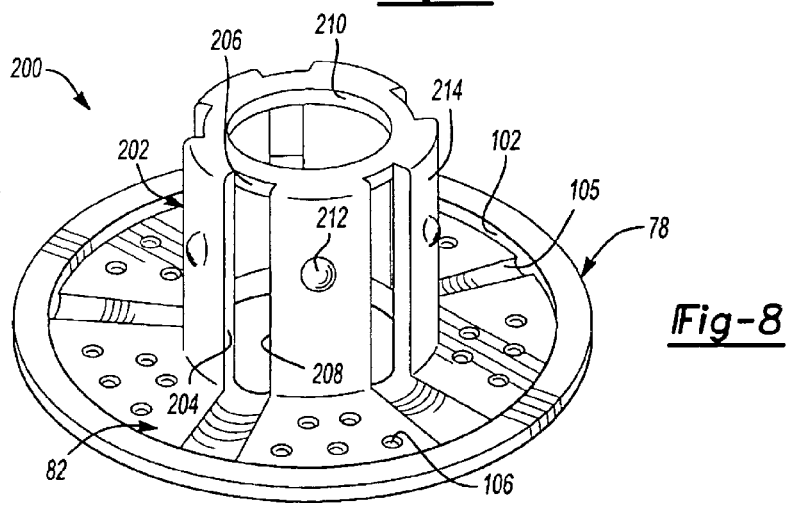
FIG. 8 is a perspective view of an alternate embodiment thrust washer constructed in accordance with the teachings of the present invention.
Figure 11:
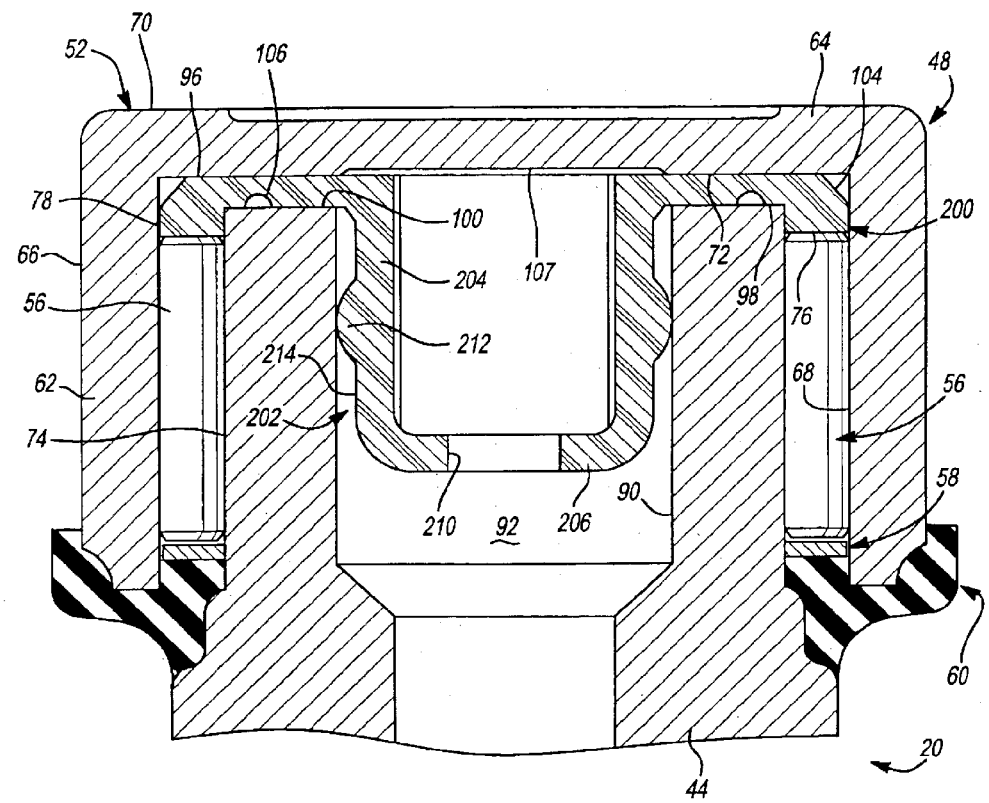
FIG. 11 is a partial cross-sectional side view of a universal joint including the thrust washer of FIG. 8.

FIGS. 2, 3 and 7 depict each bearing cup assembly 48 as including a bearing cup 52, a thrust washer 54, roller bearings 56, a seal washer 58 and an elastomeric seal 60. Bearing cup 52 is substantially hollow and cylindrical in shape. Bearing cup 52 includes a substantially cylindrical tubular segment 62 closed at one end by an end segment 64. Tubular segment 62 includes an outer wall surface 66 and an inner wall surface 68. End segment 64 includes an outer surface 70 and an inner surface 72. Roller bearings 56 are positioned between inner wall surface 68 and an outer wall surface 74 of trunnion 44 to allow relative rotary movement between bearing cup 52 and trunnion 44. Roller bearings 56 are oriented to rotate on an axis parallel to axis "Y" of trunnions 44 and are arranged in a circumferential array about this axis. One end of each roller bearing 56 is supported to roll against the bearing surface 76 formed on a circumferential flange segment 78 of thrust washer 54. The opposite ends of roller bearings 56 are captured by seal washer 58 which, in turn, is retained by seal 60. Seal 60 extends between outer wall surface 66 of bearing cup 52 and outer wall surface 74 of trunnion 44 to protect roller bearings 56 from contamination and to retain lubricant within bearing cup assembly 48.

As best shown in FIGS. 4-7, thrust washer 54 includes a disk segment 82 from which circumferential flange 78 extends. A plurality of finger portions 84 extend from disk segment 82 and are circumferentially positioned about a central aperture 86. Each of finger portions 84 include an outer surface 88 engageable with an inner surface 90 of a lubricant passage 92 found in each trunnion. A protrusion 94 is positioned on outer surface 88 to assure that each finger portion 84 biasedly engages inner surface 90 of lubricant passage 92. A fitting (not shown) mounted on central hub 42 of cruciform 20 communicates with lubricant passage 92. The fitting is used to supply lubricant to passage 92 for lubricating roller bearings 56 as well as for providing a lubricant film between relatively moveable surfaces.

Disk segment 82 has an outer face surface 96 which faces and contacts inner surface 72 of bearing cup 52. Disk segment 82 also includes an inner face surface 98 which faces and contacts an end surface 100 of trunnion 44. Inner face surface 98 and outer face surface 96 are substantially parallel such that disk segment 82 has a constant thickness. In addition, thrust washer 54 includes a circumferential inner wall surface 102 and a circumferential outer wall surface 103, as defined by flange segment 78. Circumferential inner wall surface 102 is adapted to face and contact outer wall surface 74 of trunnion 44. Circumferential outer wall surface 103 contacts inner wall surface 68 of bearing cup 52. A chamfer 104 interconnects outer face surface 96 and circumferential outer wall surface 103. As such, thrust washer 54 functions to align bearing cup 52 and trunnion 44.

Thrust washer 54 includes a series of lubrication grooves 105 which extend radially from central aperture 86 to circumferential inner wall surface 102 of flange segment 78. Grooves 105 are arcuate in profile to define a cylindrical wall surface. It is preferable that an odd number of grooves 105 are provided and which are equally spaced to define a like number of pie-shaped portions of disk segment 82. In addition a plurality of indentations or dimples 106 are formed on the pie-shaped portions of disk segment 82. Dimples 106 can be randomly oriented or, more preferably, be aligned to define two circumferential rows. Dimples 106 are adapted to retain lubricant therein to provide continuous lubrication over a large area of trunnion end surface 100. In addition, dimples 106 allow contaminants to be removed from the operating surfaces and be collected therein. A pocket 107 is formed in cup 52 for retaining lubricant in a reservoir for use during operation of the universal joint.

To assemble universal joint 10, first bearing cup assemblies 48 and second bearing cup assemblies 50 are installed on a respective trunnion. During the installation process, finger portions 84 are axially disposed within lubricant passage 92. Protrusions 94 engage inner surface 90 of lubricant passage 92 and create a friction fit between finger portions 84 and trunnion 44. In this manner, thrust washer 54 and roller bearings 56 are retained on trunnion 44. Specifically, a dislodging or removal force supplied to bearing cup 52 will be resisted by seal 60 transferring the axial load through seal washer 58, roller bearings 56 and thrust washer 54.

FIGS. 8-11 depict an alternate embodiment thrust washer identified at reference numeral 200. Thrust washer 200 is substantially similar to thrust washer 54 previously described. However, thrust washer 200 includes a generally cup-shaped prong 202 extending from disk segment 82 in lieu of finger portions 84. Prong 202 is generally cylindrically shaped having a side wall 204 and an end wall 206. Side wall 204 is interrupted by a plurality of slots 208 extending from end wall 206 to disk segment 82. An aperture 210 extends through end wall 206 to allow lubricant to pass therethrough. Each remaining portion of side wall 204 includes a protrusion 212 extending radially outwardly from an outer surface 214 of side wall 204. Protrusions 212 assure that at least a portion of prong 202 of thrust washer 200 biasedly engages inner surface 90 of lubricant passage 92. Accordingly, first bearing cup assembly 48 is axially retained on trunnion 44.

Figures 12, 13:
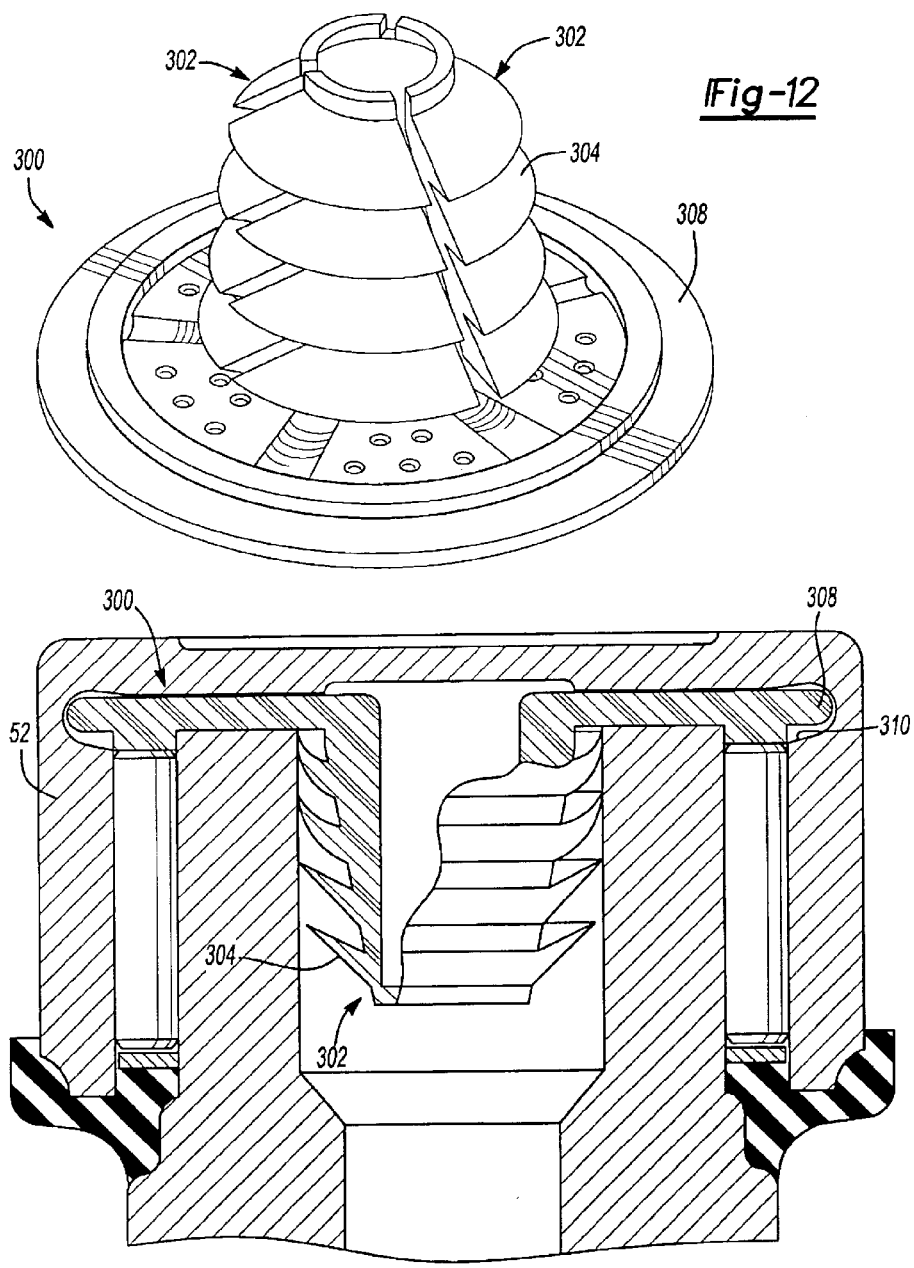
FIG. 12 is a perspective view of another alternate embodiment thrust washer.
FIG. 13 is a partial cross-sectional side view of a universal joint including the thrust washer of FIG. 12.

FIGS. 12 and 13 depict another alternate embodiment thrust washer 300. Thrust washer 300 is substantially similar to thrust washers 200 and 54. Accordingly, only the substantial differences will be described hereinafter. Thrust washer 300 includes a plurality of fingers 302 extending from disk segment 82. Collectively, circumferentially spaced fingers 302 define the shape of a cone. Each of fingers 302 includes a plurality of radially outwardly extending barbs 304. Barbs 304 are angularly positioned such that a relatively small force is required to insert fingers 302 within lubricant passage 92 but a relatively large force is required to remove fingers 302 from lubricant passage 92. Barbs 304 function to provide the increased resistance to removal of fingers 302 from lubricant passage 92 when a removing force is applied. Furthermore, the conical shape of fingers 302 provides an alignment feature assuring ease of assembly of the bearing cup assembly. The smallest portion of the cone is sized to clear inner surface 90. The largest portion of the cone is sized to interfere with inner surface 90 thereby retaining the bearing cup assembly on the trunnion.

Thrust washer 300 also includes a radially extending flange 308 positioned within a recess 310 formed at the bottom of cup 52. Flange 308 is installed within cup 52 as a snap-fit connection where thrust washer 300 is deformed during initial insertion within cup 52 and springs back to an undeformed condition once flange 308 enters recess 310.

Figure 14:
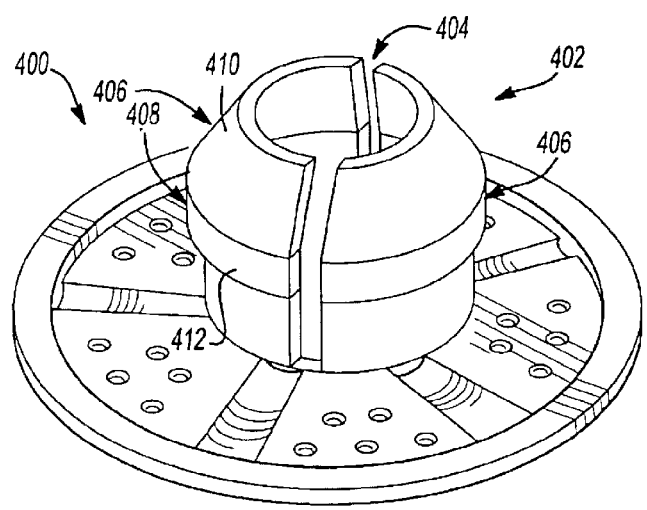
FIG. 14 is a perspective view of another alternate embodiment thrust washer.
Figure 15:
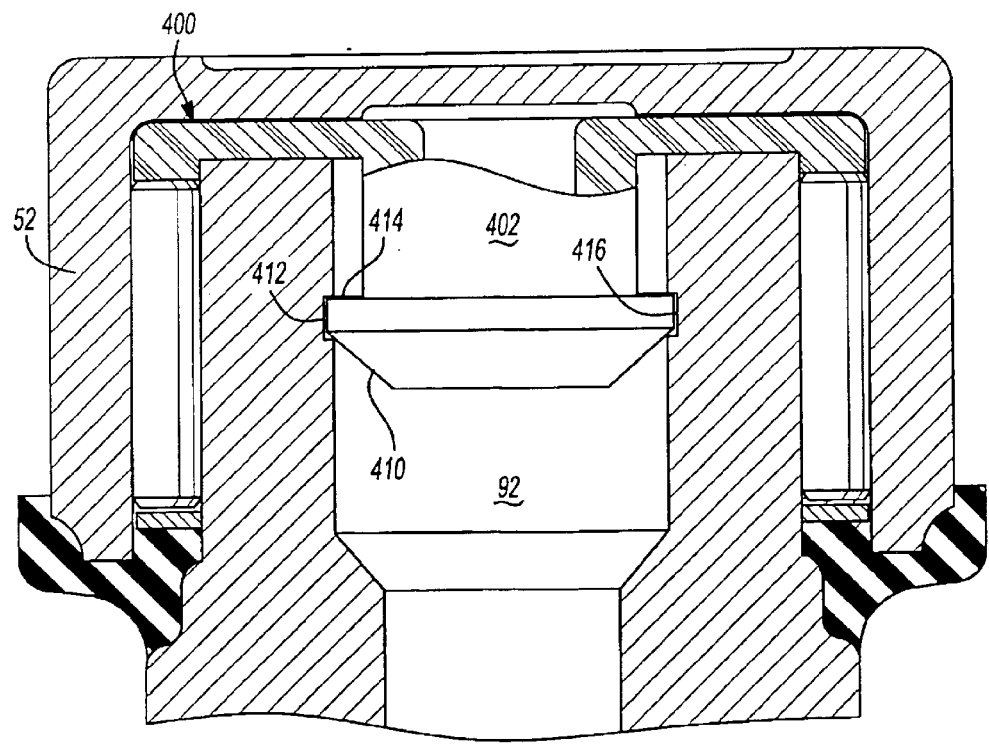
FIG. 15 is a partial cross-sectional side view of a universal joint including the thrust washer of FIG. 14.

FIGS. 14 and 15 show another alternate embodiment thrust washer depicted at reference numeral 400. Thrust washer 400 includes a prong 402 extending from disk segment 82. Prong 402 includes a bifurcated end 404 defining a pair of fingers 406. Each finger 406 includes a radially outwardly extending barb 408. Each barb 408 includes a conical lead surface 410, a cylindrical outer surface 412 and a back surface 414. Back surface 414 engages a portion of a groove 416 formed within lubricant passage 92.

During th e installation of thrust washer 400 into lubricant passage 92, fingers 406 are compressed towards one another as conical lea d surfaces 410 en gage inner surface 90 of lubricant passage 92. Because thrust washer 400 is constructed from a resilient material such as injection molded plastic, fingers 406 resiliently expand toward their undeformed position as barbs 408 enter groove 416. A snap-fit connection is formed once back surface 414 enters groove 416.

Once bearing cup assemblies 48 and 50 are installed on trunnions 44 and 46, the bearing cup assemblies are inserted into leg apertures 28 and 38. Thereafter, cruciform 20 is centered, dynamically balanced and coupled to legs 22 and 32. A variety of methods for securing yokes 16 and 18 to cruciform 20 are available. One method includes mounting a snap ring 122 within a circumferential groove 124 formed on outer wall surface 70 of bearing cup 52. Snap ring 122 engages inboard surface 24 to retain the bearing assembly. Alternatively, portions of outboard surface 26 surrounding apertures 28 may be deformed using processes such as staking or peening to create local areas which engage outer end surface 70 of bearing cup 52. Another method involves injecting molten resin within a passageway extending between the leg and the bearing cup. The molten resin solidifies to retain the bearing cup within the aperture of the leg. Yet another retention method incorporates the use of projections (not shown) extending from legs 22 which may be deformed to engage snap ring 122 against outer end surface 70 of bearing cup 52. One or more of these methods is disclosed in commonly-owned U.S. Pat. Nos. 6,280,335, 6,162,126 and 6,336,868, the entire disclosure of each being hereby incorporated by reference.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A universal joint comprising:
    a yoke including a leg having an aperture extending therethrough;
    a cruciform having a trunnion, said trunnion including a substantially cylindrical portion having an end face and a lubricant passage extending at least partially through said trunnion in communication with said end face;
    a bearing rotatably positioned on said substantially cylindrical portion; and
    a thrust washer having a substantially planar disk segment and a prong protruding from said disk segment, said disk segment engaging said end face of said trunnion, said prong engaging an inner surface of said lubricant passage to retain said bearing on said trunnion, said prong including a substantially hollow cylinder having a sidewall and an end wall with at least one aperture extending through said end wall to allow lubricant to flow through said substantially hollow cylinder.

2. The universal joint of claim 1 wherein said prong biasedly engages said inner surface.

3. The universal joint of claim 1 wherein said substantially hollow cylinder includes a plurality of slots extending through said sidewall.

4. The universal joint of claim 3 wherein said sidewall includes an outer surface, at least a portion of said sidewall including a projection extending radially outwardly from said outer surface, said projection engaging said inner surface of said lubricant passage.

5. A universal joint comprising:
    a yoke including a leg having an aperture extending therethrough;
    a cruciform having a trunnion, said trunnion including a substantially cylindrical portion having an end face and a lubricant passage extending at least partially through said trunnion in communication with said end face;
    a bearing rotatably positioned on said substantially cylindrical portion; and
    a thrust washer having a substantially planar disk segment, a flange circumscribing said disk segment and a prong protruding from said disk segment, said disk segment engaging said end face of said trunnion, said flange including an annular surface partially enveloping said substantially cylindrical portion and said prong engaging an inner surface of said lubricant passage to retain said bearing on said trunnion.

6. The universal joint of claim 5 wherein said prong is a substantially hollow cylinder having a sidewall and an end wall.

7. The universal joint of claim 6 wherein said substantially hollow cylinder includes a plurality of slots extending through said sidewall.

8. The universal joint of claim 7 wherein said sidewall includes an outer surface, at least a portion of said sidewall including a projection extending radially outwardly from said outer surface, said projection engaging said inner surface of said lubricant passage.

9. The universal joint of claim 7 wherein said disk segment includes a plurality of circumferentially spaced apart and radially extending grooves terminating at said flange.

10. The universal joint of claim 9 wherein said radially extending grooves are aligned in communication with said slots.

11. The universal joint of claim 10 wherein said disk segment includes a plurality of pockets positioned between said radially extending grooves.

12. The universal joint of claim 5 wherein said annular surface of said flange engages said cylindrical portion of said trunnion.

* * * * *